US012719230B2

(12) United States Patent
Carey et al.

(10) Patent No.: US 12,719,230 B2
(45) Date of Patent: Aug. 25, 2026

(54) PULSED RF GENERATOR, PULSED RF TRANSMITTER AND RELATED METHODS OF OPERATION

(71) Applicant: Phase Sensitive Innovations, Inc., Newark, DE (US)

(72) Inventors: Victoria Carey, Newark, DE (US); Charles Harrity, Newark, DE (US); Eliezer Shahid, Newark, DE (US); Matthew Konkol, Newark, DE (US); Christopher Schuetz, Avondale, PA (US); Peng Yao, Newark, DE (US); Dennis Prather, Newark, DE (US)

(73) Assignee: Phase Sensitive Innovations, Inc., Newark, DE (US)

( * ) Notice: Subject to any disclaimer, the term of this patent is extended or adjusted under 35 U.S.C. 154(b) by 645 days.

(21) Appl. No.: 18/120,985

(22) Filed: Mar. 13, 2023

(65) Prior Publication Data

US 2023/0291167 A1 Sep. 14, 2023

Related U.S. Application Data

(60) Provisional application No. 63/318,982, filed on Mar. 11, 2022.

(51) Int. Cl.
*H01S 3/1112* (2023.01)
*H01S 3/00* (2006.01)
*H01S 3/067* (2006.01)

(52) U.S. Cl.
CPC .......... *H01S 3/1112* (2013.01); *H01S 3/0085* (2013.01); *H01S 3/06754* (2013.01)

(58) Field of Classification Search
CPC .. H01S 3/1112; H01S 3/0085; H01S 3/06754; G02F 1/3136; G02F 1/212
See application file for complete search history.

(56) References Cited

U.S. PATENT DOCUMENTS 4,163,954 A * 8/1979 Hayes .................. H01S 3/1304 356/28
6,046,797 A * 4/2000 Spencer ............ G01M 11/3127 356/73.1

(Continued)

FOREIGN PATENT DOCUMENTS

CA 2245873 C * 11/2002 .......... H01S 5/4006
WO WO-2013127334 A1 * 9/2013 ........ H01S 3/06758

OTHER PUBLICATIONS

G.J Simonis et al., "Optical generation, distribution, and control of microwaves using laser heterodyne," May 31, 1990, IEEE Transactions on Microwave Theory and Techniques ( vol. 38, Issue: 5, May 1990), pp. 667-669.*

(Continued)

*Primary Examiner* — Omar S Ismail
(74) *Attorney, Agent, or Firm* — Muir Patent Law, PLLC

(57) ABSTRACT

An RF pulse generator may comprise a pair of phase-locked lasers that output optical tones offset in frequency by a set amount. The resulting optical signal is periodically transmitted and blocked by an optical switch to generate a pulsed optical signal. A photodiode is irradiated with the pulsed optical signal to generate a corresponding pulsed RF signal having a frequency corresponding to the frequency difference of the optical tones generated by the phase-locked lasers. An antenna may be connected to and driven by the photodiode to electromagnetically transmit the pulsed RF signal.

20 Claims, 4 Drawing Sheets

(56) References Cited

U.S. PATENT DOCUMENTS 6,208,672 B1 * 3/2001 Gunning .............. H04B 10/508 372/12
8,311,410 B2 * 11/2012 Watanabe ............... H04J 14/08 398/178
9,166,355 B2 * 10/2015 Messerly ............ H01S 3/06758
2003/0058504 A1 * 3/2003 Cho ................... H04B 10/2543 398/147
2003/0174379 A1 * 9/2003 Gupta .................. G02B 6/4215 359/278
2006/0045445 A1 * 3/2006 Watanabe ............. G02F 1/3515 385/11
2007/0025421 A1 * 2/2007 Shattil .............. H04B 10/25752 375/136
2008/0075464 A1 * 3/2008 Maleki ............... G02B 6/29395 398/85
2009/0219959 A1 * 9/2009 Murison ............. H01S 3/10084 372/25
2010/0014874 A1 * 1/2010 Kawanishi ......... H04B 10/5053 398/187
2011/0001959 A1 * 1/2011 Hasegawa ............ H04B 10/071 356/73.1
2013/0025374 A1 * 1/2013 Voskoboinik ...... G01D 5/35364 73/655
2015/0160351 A1 * 6/2015 Xi ...................... G01R 33/0041 250/227.23
2018/0048113 A1 * 2/2018 Fermann ............. H01S 3/06712
2018/0294946 A1 * 10/2018 Sinclair .................. H04B 10/61
2019/0154439 A1 * 5/2019 Binder .................... G01S 15/42
2019/0393962 A1 * 12/2019 Zhang ................... H01S 5/0657
2021/0018814 A1 * 1/2021 Gowda ................... H04J 14/08
2021/0021914 A1 * 1/2021 Perlmutter ............. H04B 10/61
2021/0212755 A1 * 7/2021 Jimenez ............. A61B 18/1206

OTHER PUBLICATIONS

Cristian Manzoni et al.,"Coherent pulse synthesis: towards sub-cycle optical waveforms," Jan. 2, 2015, Laser Photonics Rev. 9 , No. 2, 129-171 (2015), pp. 129-164.*

* cited by examiner

PULSED RF GENERATOR, PULSED RF TRANSMITTER AND RELATED METHODS OF OPERATION

STATEMENT OF GOVERNMENT INTEREST

This invention was made with government support under Laboratory contract FA8650-19-C-1027 awarded by U.S. Air Force Research Laboratory. The government has certain rights in the invention.

RELATED APPLICATIONS

This application is a non-provisional of U.S. Application No. 63/318,982 filed Mar. 11, 2022, the entire contents of which are hereby incorporated by reference in their entirety.

BACKGROUND

Pulsed radiofrequency (RF) signals comprise a series of pulsed (gated) RF signals. Pulsed RF signal generation systems have developed from electronic systems employing IMPATT diodes to photonic systems employing photodiodes. Pulsed RF is used in radar and medical field (therapeutic) applications. Recently, interest in pulsed transmitters has increased in view of the use of pulse transmitters in many anti-collision radar systems in the automobile industry. Carrier frequencies for many of these transmitters are in the W-band due to a local minimum in atmosphere absorption across 75-110 GHz that reduces loss at these frequencies, thus enabling practical system deployment and access to improved object detection.

SUMMARY

In the disclosed pulse generator architecture, a pair of phase-locked lasers output optical tones offset in frequency by a set amount. The resulting optical heterodyne signal is periodically transmitted and blocked by an optical switch to generate a pulsed optical signal. A photodiode PD is irradiated with the pulsed optical signal to generate a corresponding pulsed RF signal having a frequency corresponding to the frequency difference of the optical tones generated by the phase-locked lasers.

RF generation is shifted from the electrical domain to the optical domain by generating the desired RF frequency at the photodiode PD via an optical beat frequency. This reduces the performance requirements of the RF oscillator and EO phase modulator. Shifting the RF generation to the optical domain allows the RF tuning to be performed in the optical domain, which can span multiple octaves of RF bandwidth. Conversion loss in the modulator may be avoided, and optical amplification may be unnecessary in some systems. In some examples, the pulsed RF signal generated by the PD may be applied directly to an antenna without the use of an RF transmission line and/or RF amplifier.

BRIEF DESCRIPTION OF THE DRAWINGS

The accompanying drawings are included to provide a further understanding of exemplary device, system and method embodiments of the invention. In the drawings.

DETAILED DESCRIPTION

The present disclosure now will be described more fully hereinafter with reference to the accompanying drawings, in which various exemplary implementations are shown. The invention may, however, be embodied in many different forms and should not be construed as limited to the exemplary implementations set forth herein. These example exemplary implementations are just that—examples—and many implementations and variations are possible that do not require the details provided herein. It should also be emphasized that the disclosure provides details of alternative examples, but such listing of alternatives is not exhaustive. Furthermore, any consistency of detail between various examples should not be interpreted as requiring such detail—it is impracticable to list every possible variation for every feature described herein. The language of the claims should be referenced in determining the requirements of the invention.

The terminology used herein is for the purpose of describing particular exemplary implementations only and is not intended to be limiting of the invention. As used herein, the singular forms "a", "an" and "the" are intended to include the plural forms as well, unless the context clearly indicates otherwise. As used herein, the term "and/or" includes any and all combinations of one or more of the associated listed items and may be abbreviated as "/".

Terms such as "about" or "approximately" or "on the order of" may reflect amounts, sizes, orientations, or layouts that vary only in a small relative manner, and/or in a way that does not significantly alter the operation, functionality, or structure of certain elements.

It will be understood that when an element is referred to as being "connected" or "coupled" to or "on" another element, it can be directly connected or coupled to or on the other element or intervening elements may be present. In contrast, when an element is referred to as being "directly connected" or "directly coupled" to another element, or as "contacting" or "in contact with" another element, there are no intervening elements present. Other words used to describe the relationship between elements should be interpreted in a like fashion (e.g., "between" versus "directly between," "adjacent" versus "directly adjacent," etc.).

As used herein, elements described as being "electrically connected" are configured such that an electrical signal can be passed from one element to the other. Similarly, elements described as being "optically connected" (or in optical communication) are configured such that an optical signal can be transmitted from one element to the other. It should be appreciated that the electrical (or optical) signal transmitted between the electrically (or optically) connected elements may be attenuated, split or combined with other electrical (or optical) signals as it travels between the electrically (or optically) connected elements.

Figure 1:
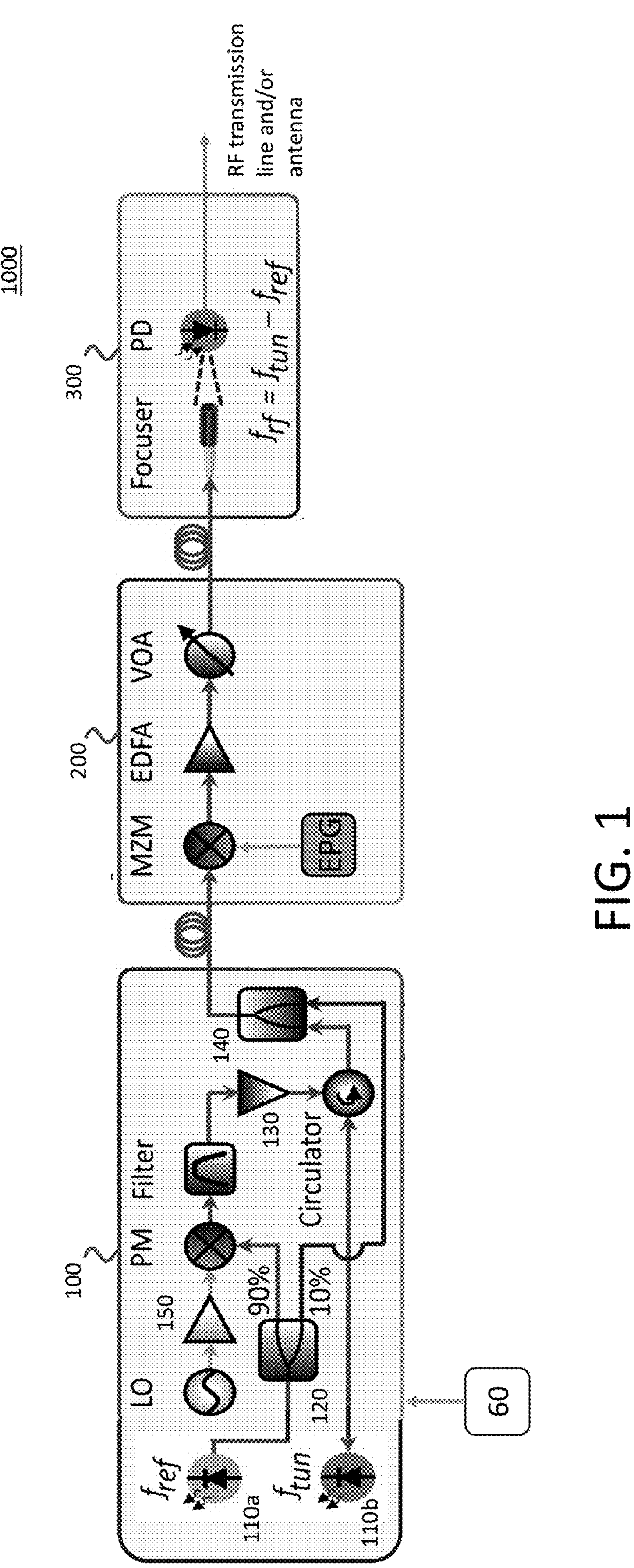
FIG. 1 illustrates a pulse generator 1000 according to certain embodiments of the present invention.

FIG. 1 illustrates an RF pulse generator 1000 according to certain embodiments of the present invention comprising a tunable optical paired source (TOPS) 100, an optical pulse generator 200 and an RF pulse generator 300. When RF pulse generator is coupled to an antenna, it may comprise an RF pulse transmitter.

The tunable optical paired source (TOPS) 100 comprises a pair of lasers, reference laser 110$a$ and tune laser 110$b$, that generate optical tones (optical signals) that are offset in frequency with respect to each other by a set difference. The optical tones generated by the lasers 110*a* and 110*b* are also phased locked with each other. Specifically, reference laser 110*a* generates an optical tone having a frequency $f_{ref}$ and the tune laser 110*b* generates an optical tone having a frequency $f_{tun}$. The optical tones are combined by optical combiner 140 and the resulting optical signal is output to the optical pulse generator 200.

At the same time, an RF tone is generated by local oscillator (LO) and input to a saturated low noise amplifier or non-linear transmission line 150 to generate a frequency comb of the LO that is then upconverted as sidebands of the reference laser by an electro-optic phase modulator PM. The comb includes harmonics at integer multiples of the LO that can be selected by an optical filter and/or thermal tuning of the tune laser 100*b*, which dictates the RF frequency $f_{rf}$ of the RF carrier (the RF frequency of the pulse). In the measurements of the experimental results discussed below, the LO is set to 19.25 GHz and the fourth harmonic is selected for an RF carrier having an RF frequency $f_{rf}$ of 77 GHz. The optical filter may be a bandpass optical filter having a bandpass extending about (e.g., centered on) a selected harmonic and/or selected sideband. Depending on the optical filter and/or the frequency width of the sideband, other harmonics of the selected sideband may be attenuated by the optical filter and effectively blocked. The optical filter also suppresses the optical carrier frequency $f_{ref}$ and the other sideband output by the electro-optic phase modulator PM. In some embodiments the suppression of the remaining harmonics (other than the passed single harmonic) of the modulated beam may be attenuated by at least 3 dB. For example, the optical filter may have a passband of 5 GHz or less (where the outer range of the passband corresponds to a 3 dB attenuation as compared to maximum power transmission) where out of band suppression is at least 20 dB, such as at least 30 dB (where such suppression is reached at an offset of approximately 10 GHz from the center of the filter passband). When the passband of the optical filter encompasses only a single harmonic, the optical filter may be responsive to identify (select) the harmonic to be resonated by laser 110*b*, thereby not necessitating laser 110*b* to filter and select between several harmonics as the resonant frequency of laser 110*b*. As the laser 110*b* may be relieved of this filtering role, laser 110*b* may be implemented to provide a wider locking range, which may improve the overall phase-noise performance of the system.

Rather than an optical filter, a Mach-Zehnder Interferometer (MZI) type modulator may be used. Once the desired sideband and/or harmonic is selected by the optical filter, it may be optionally amplified by an optical amplifier 130 and then is injected into the tune laser 110*b* with a circulator. When $f_{tun}$ is near the frequency of the injected harmonic, which may be achieved by thermal tuning, it will lock to this selected harmonic of the sideband, resulting in the lasers 110*a* and 110*b* being phased-locked to each other.

The local oscillator LO may be a voltage controlled oscillator having an input (e.g., voltage) that controls the frequency of the RF reference signal generated by the LO (and thus controls the RF frequency of the pulse $f_{rf}$). The optical filter may also be adjustable to select different harmonics of the comb output by the electro-optic phase modulator PM. The frequency of the RF reference signal of the LO and/or the optical filter (and thus the RF frequency of the pulse), may be selectable by a user of the pulse generator 1000, such as by being generated in response to a controller 60 (a microcontroller, a computer configured by software, switches, codes provided by a programmable fuse bank, etc.). It should be appreciated that although FIG. 1 illustrates the laser 110*b* as the tuning laser that may adjust its frequency, in other examples, laser 110*a* may be a tuning laser with an adjustable frequency to adjust and set the difference in frequencies of the optical tones of the lasers 110*a* and 110*b* $f_{rf}$. Further details of the TOPS 100 operation and structure are disclosed in U.S. Pat. No. 10,965,100, provisional Application No. 62/289,673, via its detailed description including Schneider et al. "Radiofrequency signal-generation system with over seven octaves of continuous tuning," *Nat. Photonics*, vol. 7, no. 2, pp. 118-122, February 2013, the contents of each of which are herein incorporated by reference in their entirety for the teachings of details of structure and operation of TOPS.

Thus, by adjusting and setting the frequency of laser 110*b* or laser 110*a* as described herein, the difference in frequencies of the optical tones of the lasers 110*a* and 110*b* may be adjusted and set, and thus the frequency of the RF carrier frequency $f_{rf}$ (which is equal $f_{ref}$-$f_{tun}$) may be adjusted and set. The RF carrier frequency $f_{rf}$ of the pulse generator 1000 may be the same or an integer multiple of the frequency as the RF reference signal provided by the RF reference source (e.g., the local oscillator LO) and may be adjustable by controller 60, either in real time or for different uses/implementations of pulse generator 1000.

Figure 2A:
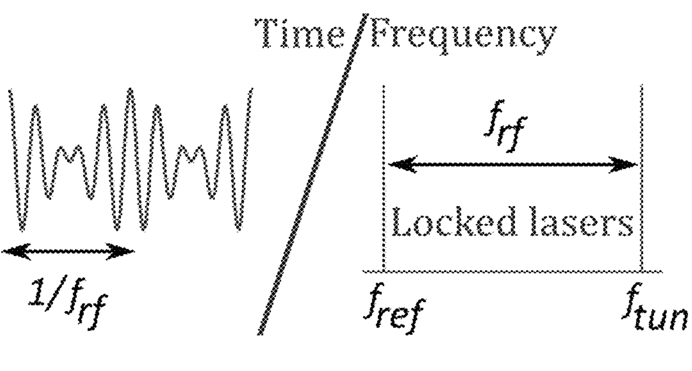
FIGS. 2A, 2B and 2C respectively illustrate, in both time and frequency, the generated optical signal generated, the gated optical signal output by the optical switch (MZM), and the pulsed RF signal output by the photodiode PD.

The optical tones output by lasers 110*a* and 110*b* are then combined by optical combiner 140 to generate a heterodyned optical signal having a beat frequency equal to the difference between $f_{ref}$ and $f_{tun}$—the frequencies of the optical tones produced by lasers 110*a* and 110*b*, or $f_{rf}$. Neglecting phase variations (which are insignificant at RF frequencies) and assuming pure sinusoidal tones, the time-varying optical signal generated by the TOPS can be expressed mathematically as:

$$E_{inc} \propto \sqrt{P_{ref}}\cos(2\pi f_{ref}t) + \sqrt{P_{tun}}\cos(2\pi f_{tun}t), \tag{1}$$

where $P_{ref}$ and $P_{tun}$ are the laser powers, and $f_{ref}$ and $f_{tun}$ are the laser frequencies. FIG. 2A illustrates in both time and frequency the optical heterodyned signal generated by TOPS 100 as represented by Eq. (1). It should be appreciated that because the optical tones output by lasers 110*a* and 110*b* are phase locked, any phase variation in one is reproduced in the other. Thus, even if phase variations which might typically be considered significant at optical frequencies were to be introduced to the to the optical tone generated by laser 110*a*, such phase variations would be reproduced in the optical tone generated by laser 110*b*, and any resulting phase shift in the RF beat signal would be insignificant.

Figure 2B:
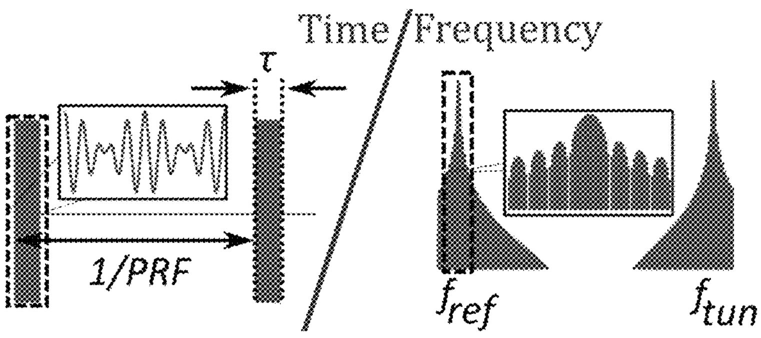

The optical signal generated by the TOPS is provided to the optical pulse generator 200 where it is input into an optical switch that selectively passes (gates) the optical signal to provide a gated optical signal. In this example, the optical switch is implemented by a low-speed, null-biased Mach-Zehnder modulator (MZM). The electrical input of the MZM receives an electrical gating signal in the form of a pulse train from the electrical pulse generator EPG to periodically alternate between passing and blocking the optical signal. It should be appreciated that the passed optical signal may be attenuated to some extent and that the blocked optical signal may have some minor portion passed. In general, a fully passed optical signal by the optical switch should not be attenuated by more than 3 dB, while an optical signal attenuated by 20 dB or more may be considered blocked by the optical switch. Preferably, the optical signal is attenuated by more than 30 dB when the optical switch is off. The electrical pulse train comprises a series of regularly spaced pulses, with each pulse having a voltage of $V_\pi+V_{null}$ to operate the MZM at peak bias (to thereby turn on the optical switch and allow the optical signal to pass and be output). Between these pulses, the voltage of the electrical pulse train is set to $V_{null}$ to operate the MZM at null bias (to thereby turn off the optical switch, blocking the optical signal from being output). In this case, the gating occurs due to MZM operation at null bias having the pulse train gating signal as its electrical input, with the low and high voltage levels of the pulse train gating signal set to $V_{null}$ and $V_\pi+V_{null}$, respectively. This results in a swing between null bias and peak bias at the onset of each pulse. Since null bias is the destructive interference condition for the MZM (the MZM optical switch is off), and peak bias is the constructive interference condition the (the MZM optical switch is on), the swing between the two performs a switching operation, effectively gating the optical signal in time. The pulse train gating signal may be generated by a conventional pulse generator (a circuit, also referred to as a digital delay and/or pulse train generator). The electrical pulse generator EPG may also include other circuitry, such as a modulator driver under the control of a bias controller, which may receive the pulse train from the digital delay/pulse train generator to provide the pulse train gating signals with desired voltage levels. The resulting time-varying pulse train gating signal of the EPG provided to the MZM can be expressed using a Fourier series as:

$$G \propto \delta\left(1 + 2\sum_{n=1}^{N} \text{sinc}(n\delta)\cos\left(\frac{2\pi n}{T}t\right)\right), \tag{2}$$

where $\delta$ is the duty cycle ($\delta=\tau/T$), $\tau$ is the pulse width, and T is the pulse period. FIG. 2B illustrates (in both time and frequency) the gated optical signal output by the optical switch (MZM), corresponding to the product of Eq. (1) and Eq. (2). The optical pulse train (the pulsed optical signal) formed by the gated optical signal output by the optical switch (MZM) thus has a waveform (including duty cycle, pulse width and pulse period) corresponding to that of the electrical gating signal provided to the optical switch (MZM) by the electrical pulse generator EPG. It should be appreciated that the electrical gating signal provided to the optical switch (MZM) may have differently shaped waveforms other than rectangular pulses (that separated by null or zero frequency signal), such as a sawtooth, triangle or sinewave shaped gating signals, to cause the RF pulse generator to generate periodic packets of RF (the envelopes of the RF signal amplitude) in the respective forms of sawtooths, triangles, or sine waves, rather than in the form of a pulse. Furthermore, the EPG may control the power of the pulsed RF signal generated by the RF pulse generator 300 by adjusting the magnitude of the pulse and/or pulse shape generated by the EPG. For example, the magnitude of the pulse may be adjusted lower than the voltage $V_\pi+V_{null}$ at which the MZM operates at peak bias to pass an attenuated version of the optical signal that is used to generate the pulsed RF signal.

The optical pulse generator 200 may optionally include additional optical devices. For example, following the optical switch (MZM), the gated optical signal may be passed through an erbium-doped fiber amplifier and a variable optical attenuator before being provided to the RF pulse generator 300. Alternatively, the gated optical signal may be provided directly from the optical switch to the RF pulse generator 300.

The RF pulse generator 300 comprises a photodiode PD. The gated optical signal provided to the RF pulse generator 300 is focused by a lens and irradiated onto the photodiode PD. The photodiode PD converts the gated optical signal into a pulsed RF signal, the pulses of which have an RF frequency $f_{rf}$ equal to the beat frequency (the heterodyne frequency) of the pulse portions of the gated optical signal, or ($f_{tun}$-$f_{ref}$). The pulsed RF signal output from the PD may be supplied to an RF transmission line, such as a reference-signal-reference (e.g., ground-signal-ground) coplanar waveguide or provided directly to an antenna (not shown). The bias applied to the RF transmission line (i.e., the reference voltage) may also be transmitted to the PD by the RF transmission line as the bias voltage of the PD. This signal path may be enabled via a bias tee (not shown) connected to the photodiode PD via the RF transmission line.

The pulsed RF signal may be supplied to an antenna (which may comprise one or more antenna elements), either directly without use of an RF transmission line or through the RF transmission line. Furthermore, the pulsed RF signal may be applied to an antenna (without or without use of an RF transmission line) without additional amplification. The antenna elements may have one or more radiating arms designed to operate with a particular RF carrier frequency and/or a particular RF frequency band (i.e., including the operating RF carrier frequency $f_{rf}$ described herein). For example, such radiating arms may be substantially equal to one half the wavelength of the RF electromagnetic wave at the $f_{rf}$ RF carrier frequency. When the pulsed RF signal is applied directly to the antenna without use of an RF transmission line, conductors connecting the photodiode PD to the antenna are preferably less than one half of the wavelength, and more preferably less than one quarter of the wavelength of the RF carrier (e.g., less than one half of the RF electromagnetic wave at the RF carrier frequency $f_{rf}$). By keeping the conductors that connect the photodiode to the antenna short in total length (e.g., less than half of a dipole antenna length, or less than the length of a radiation arm of an antenna), conductors may provide the driving current to the radiating arm(s) of the antenna without causing problems that might otherwise result from electromagnetic radiation being emitted from such conductors. The antenna and the photodiode may also be integrated together, such as integrally formed on the same printed circuit board or other substrate. See, e.g., U.S. Pat. No. 10,490,893, herein incorporated by reference in its entirety, for exemplary antenna and photodiode integrations that may avoid use of a transmission line. Thus, the photodiode may be connected to an antenna without requiring a transmission line and/or an RF amplifier and avoid the resulting signal imbalance resulting from use of the same. Thus, baluns may not be necessary, providing a significant reduction in cost, size and complexity.

Due to the tunability of the RF carrier frequency $f_{rf}$ of the pulsed RF signal, the same pulsed RF signal generator 1000 may be used to transmit RF signals at significantly different RF frequencies. For example, the pulsed RF signal generator 1000 may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. Operation in the W-band, such as 75-110 GHz may be implemented when the pulsed RF signal generator 1000 is implemented as an anti-collision pulsed RF transmitter. The invention may also be used with other communication frequencies outside of radio frequencies. To facilitate electromagnetic RF transmissions at these different frequencies, different antennas may be connected to the RF signal generator 1000 via an RF connector (not shown), e.g., forming the output port of the RF signal generator 1000 or connected to the opposite (downstream) end of the RF transmission line.

The pulsed RF signal output from the photodiode PD corresponds to the optical pulse train formed by the gated optical signal output by the optical switch MZM. The pulsed RF signal has a waveform (including duty cycle, pulse width and pulse period) corresponding to that of the electrical gating signal provided to the optical switch (MZM) by the electrical pulse generator EPG and that of the optical pulse train.

Figure 2C:
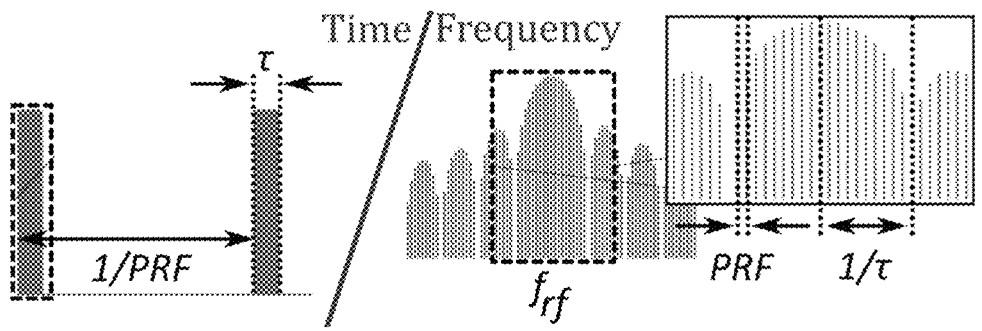

Specifically, the PD produces pulsed RF signal having pulses with a pulse width (PW) photocurrent (an RF electrical signal) that follows the incident optical signal as:

$$I_{ph} = \mathrm{R}HP_{inc} \propto \mathrm{R}HG|E_{inc}|^2, \tag{3}$$

where R is the average PD responsivity in amperes per watt, and H is a dimensionless quantity that describes the frequency response. Expanding the square and simplifying gives:

$$I_{ph} \propto \mathrm{R}HG\left[\frac{P_{ref}+P_{tun}}{2}+\sqrt{P_{ref}P_{tun}}\cos(2\pi f_{rf}t)\right], \tag{4}$$

where $f_{rf}$ is the desired RF frequency (equal to ($f_{tun}$-$f_{ref}$)), and all higher frequency terms have been assumed negligible. FIG. 2(*c*) illustrates (in both time and frequency) the pulsed RF signal (having pulses as represented by Eq. (4)) output by the photodiode PD. After the PD generates the RF pulse, the bias tee filters the signal such that only the photocurrent associated with the second term in Eq. (4) (the sinusoidal portion of the photocurrent of Eq. (4) is output by the bias tee filter (e.g., the constant portion of the PW photocurrent (associated with the first term in (4) (($P_{ref}$+$P_{tun}$)/2) is removed by the bias tee filter).

In FIG. 1, the connections (represented with solid brown lines) shown between the local oscillator, the amplifier 150 and phase modulator PM; the output of the photodiode PD; the output of the electrical pulse generator; and the connection of the controller 60 to the TOPS may comprise conductors (which may be RF transmission lines/waveguides when transmitting an RF signal). The photodiode PD may be in optical communication with the focuser (e.g., lens) via free space (air) (represented by a dashed blue line) or an optical waveguide. The connection of the remaining components (represented with solid blue lines) may be optical waveguides, preferably optical fiber due to their widespread availability and ease of use.

Experimental Results

To analyze the power of the PW photocurrent, a probe (a ground-signal-ground coplanar waveguide acting as the RF transmission line) was used to capture the PW signal output by the PD. The PW signal output by the bias tee filter was transmitted through a waveguide attenuator and into a harmonic mixer and electronic signal analyzer (ESA). To ensure accurate power measurements, the insertion loss of the RF network from the output of the probe to the output of the attenuator was measured, as well as the conversion loss from the mixer to the ESA. In addition to RF losses, the PW signal experiences pulse desensitization due to the Fourier transform process that takes place in the ESA. This pulse desensitization relates the power displayed at $f=f_{rf}$ for a PW signal to the power that would be displayed at $f=f_{rf}$ for the continuous wave (CW) equivalent (the continuous wave signal where the MZM is always fully on resulting in a continuous RF signal output by the PD at constant power). In this way, the CW equivalent can be thought of as the signal captured only during the pulse width PW. Consequently, the CW equivalent power represents the PW peak power. Therefore, if a PW signal is measured with the ESA, the pulse desensitization can be used to determine its peak power, and subsequently its average power.

PW measurements were taken at 77 GHz with a pulse period of 1 μs (pulsed repetition frequency (PRF)=1 MHz, or 1,000,000 pulses per second) and varying the duty cycle δ. The minimum δ was 0.5%, corresponding to a pulse width of 5 ns. The pulsed RF signal was generated using the system shown in FIG. 1 and 8-μm diameter CC-MUTC PDs. Optical coupling conditions were such that the average responsivity was 0.08 A/W, approximately 50% of its maximum. This defocusing is a technique employed for surface-illuminated PDs that is believed to improve power handling by promoting lower peak-to-average photocurrent densities.

The peak PD output power was calculated following:

$$P_{pk}(dBm) = P_{ESA} + L_{rf} - 20\log_{10}(\delta), \tag{5}$$

where $P_{ESA}$ is the measured power, $L_{rf}$ is the RF insertion loss from the probe to the ESA, which was 35.9 dB at 77 GHz, and the expression 20 log 10(δ) represents the pulse desensitization discussed herein. The RF insertion loss was dominated by the waveguide attenuator that was inserted to protect the measurement devices; excluding the RF insertion loss of the waveguide attenuator, the RF loss was 6.9 dB. The average PD output power was calculated following:

$$P_{av}(dBm) = P_{pk} - 10\log_{10}(\delta). \tag{6}$$

Figure 3:
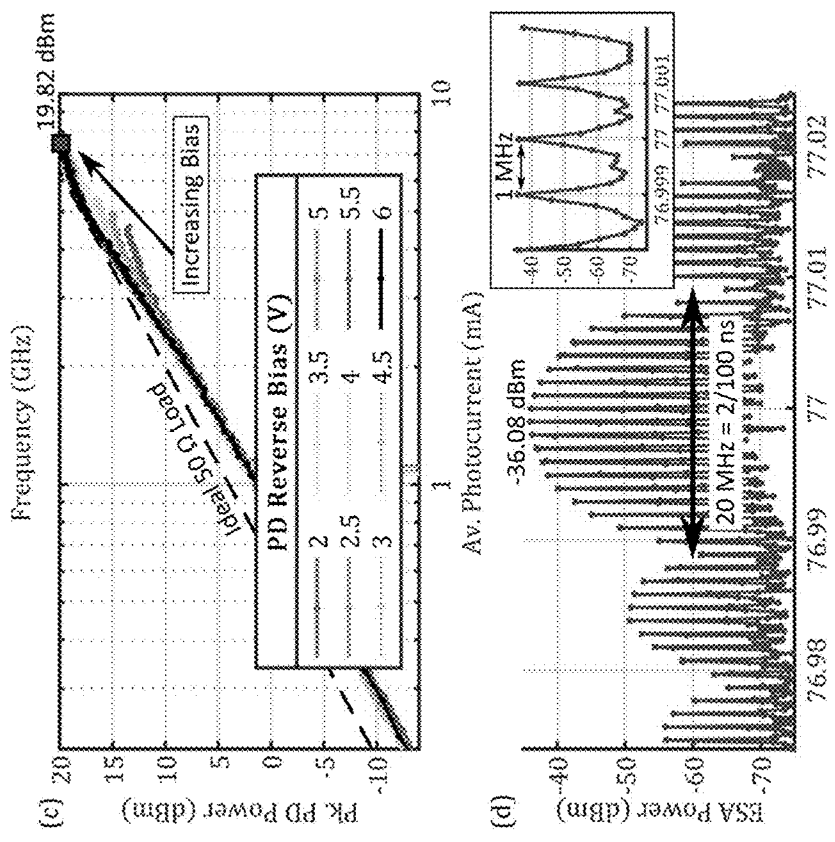
FIGS. 3 and 4 illustrate plots relating to experimental results.
Figure 3:
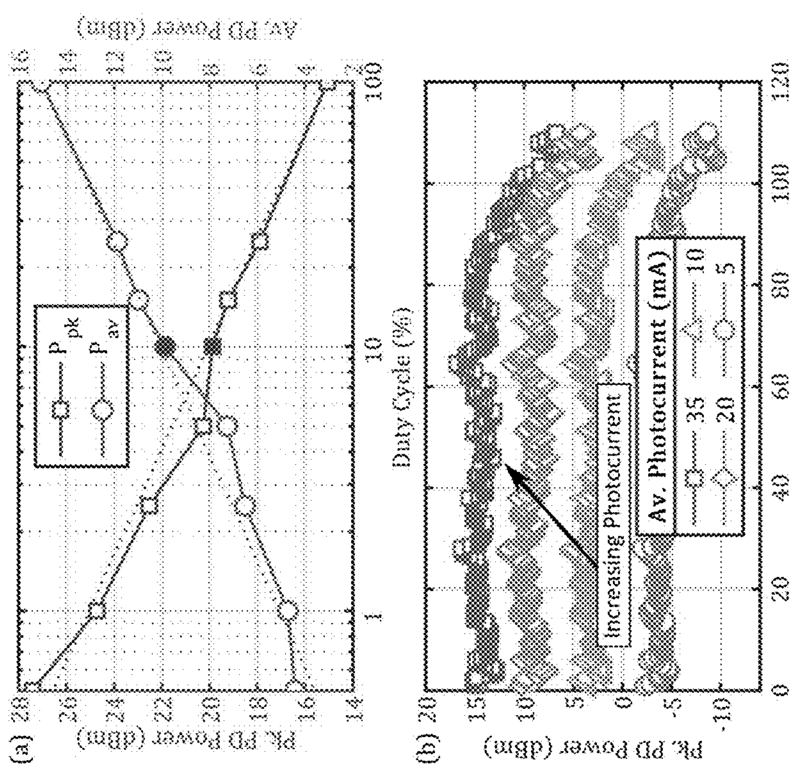

FIG. 3, plot (a) shows the maximum measured PD peak and average output powers as a function of δ. As shown, the observed trends in peak and average PD output power are reciprocal and exponential with changes in δ. The dotted lines in FIG. 3, plot (a) were calculated following a log scale of:

$$P_{pk}(W) = P_{cw}\left(\sqrt{\delta}\right)^{-1} \text{ and } P_{av}(W) = P_{cw}\sqrt{\delta}, \tag{7}$$

where $P_{cw}$ was the maximum PD output power measured during CW operation. Accordingly, it was observed that the peak PD output power could be increased under PW conditions proportional to 1/√δ. This led to peak power improvement upward of 1000% with δ<1%. However, as the peak power improved, the average power degraded. The average power decreased by more than 90% with δ<1%. However, increasing average power by further increasing the peak power may be possible with other PD designs.

Figure 4:
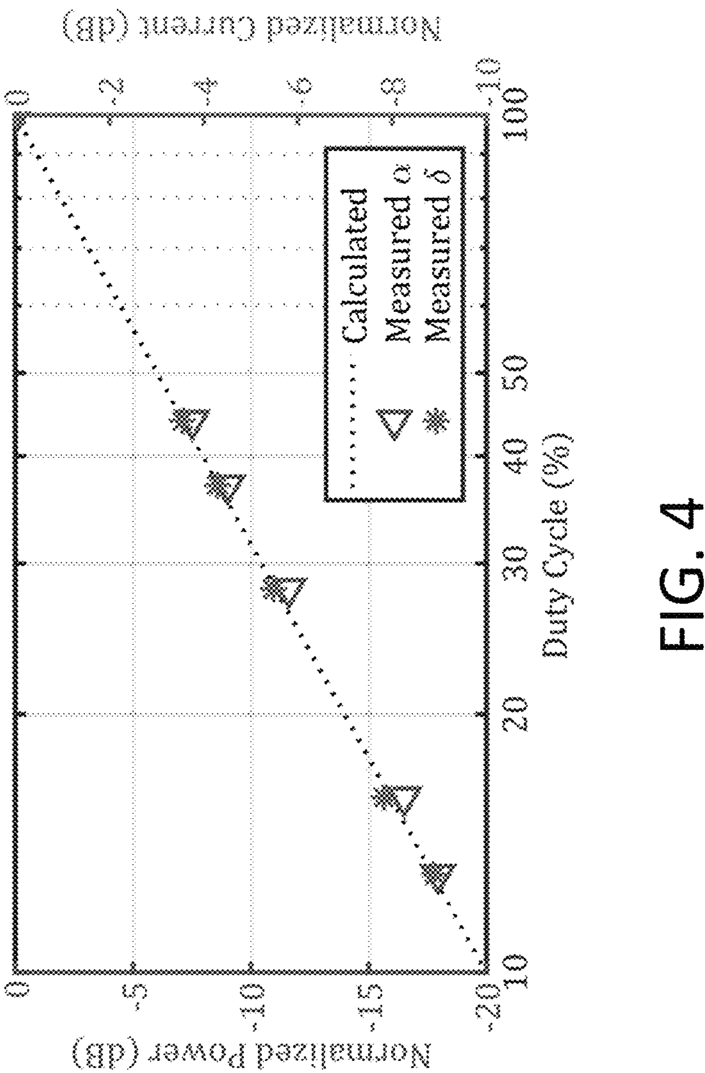

The observed improvement in peak PD output power can be explained by PW operation enabling increased saturation levels that would otherwise cause thermal runaway and device failure. FIG. 3, plot (b) shows the PD output power during CW operation. For these measurements, the reverse bias was held constant (4 V), $f_{rf}$ was varied, and each curve represents a different $I_{av}$. As shown, PD response above 80 GHz shows signs of saturation at 35 mA, indicated by the enhanced frequency rolloff. CW operation failed above 4V for this photocurrent and limited PD output power. FIG. 3, plot (c) shows the PD output power during PW operation with δ=10%. For these measurements, $f_{rf}$ was held constant (77 GHz), $I_{av}$ was varied, and each curve represents a different reverse bias. As shown, PD saturation was pushed to higher and higher photocurrent as the reverse bias was increased. This behavior is commonly attributed to space charge resulting from the field imposed by the photogenerated carriers opposing the field imposed by the applied reverse bias. As more carriers are generated (higher photocurrent), there exists more opposition to displacement current, and thus more reverse bias is required to maintain linearity. In the absence of saturation, frequency dependence, and laser imbalance, the expected PD output power during PW operation can be expressed as:

$$P_{ideal} = \langle I_{pk}^2 \rangle R_{load}, \tag{8}$$

where $I_{pk}=I_{av}/\delta$, $I_{av}$ is the time average of $I_{ph}$ in Eq. (4), and $R_{load}$ is the resistance across which the power is measured. Following Eq. (8), an increase in peak photocurrent, provided by an increase in reverse bias voltage, results in an increase in maximum PD output power $P_{pk}$. This relationship was observed as δ decreased and is summarized by FIG. 4 and Table I.

TABLE I

| Signal Characteristics at Maximum | | | | | | |
|---|---|---|---|---|---|---|
| τ (ns) | δ (%) | $I_{av}$ (mA) | $P_{av}$ (dBm) | $I_{pk}$ (mA) | $P_{pk}$ (dBm) | Reverse Bias (V) |
| 5 | 0.5 | 1.5 | 4.4 | 300 | 27.4 | 9 |
| 10 | 1 | 2.1 | 4.7 | 210 | 24.7 | 9 |
| 25 | 2.5 | 2.8 | 6.5 | 112 | 22.5 | 8 |
| 50 | 5 | 5.2 | 7.3 | 104 | 20.3 | 6.5 |
| 100 | 10 | 7.7 | 9.9 | 77 | 19.8 | 6 |
| 150 | 15 | 10.5 | 11 | 70 | 19.2 | 5.5 |
| 250 | 25 | 14.5 | 11.9 | 58 | 17.9 | 5 |
| 1000 | 100 | 35 | 15.1 | 35 | 15.1 | 4 |

To verify expected pulse characteristics, FIG. 3, plot (d) shows the trace captured from the ESA during the maximum power measurement with δ=10%. The trace captured was consistent with the expected signal behavior as illustrated in FIG. 3. Specifically, the bandwidth occupied by the central lobe is 20 MHz, which is twice the expected bandwidth from the center frequency to the first null as dictated by the reciprocal of τ=100 ns. In addition to the bandwidth of the central lobe, the PRF is also consistent with the expected value of 1 MHz, as shown by the FIG. 3, plot (d) inset.

The results demonstrated generation of possibly record high W-band photonic pulsed power using a widely tunable optical heterodyne system with a high-speed, high-power PD. PD output power varied as a function of duty cycle for a 1 MHz PRF. A peak PD output power of 27.4 dBm was measured at 77 GHz for a duty cycle of 0.5%. This is possibly the highest reported output power for a W-band PD and a W-band photonic system. In addition to the improved PD power generation, the pulse generator 1000 may easily be implemented with ultrawide bandwidth and tunability.

The pulsed RF generator and pulsed RF transmitters described herein may operate and communicate with a wide range of radio frequencies, such as millimeter wave (e.g., about 30 to 300 GHz), microwave (e.g., 1 to 170 GHz), SHF (3 GHz to 30 GHz), UHF (300 MHz to 3 GHz), VHF (30 to 300 MHz), to radio frequencies as low as 300 KHz or even 30 KHz. The invention may also be used with other communication frequencies outside of radio frequencies. The invention may be applied to frequencies above millimeter wavelength frequencies (e.g., terahertz radiation band between infrared light and millimeter wavelength RF), with a dependence on the ability to convert the beat frequency of the interfering optical tones to an electromagnetic wave (e.g., in the detailed embodiments disclosed herein, would depend on the ability of the photodetector to convert the beat frequency of the combined optical tones to the appropriate higher frequency, and for RF transmitters, for the antenna to transmit the same).

The optical tones generated by lasers 110*a*, 110*b* described herein may be visible light or invisible light (e.g., infrared, ultraviolet). Use of other waveguides other than a fiber optics may also be implemented, however widespread availability and ease of use of fiber optics make such waveguides preferable.

Although aspects of embodiments of the present invention has been described, it will be appreciated that the invention may take many forms and is not limited thereto. It will be apparent to those skilled in the art that various substitution, modifications and changes may be made with respect to the disclosed embodiments without departing from the scope and spirit of the invention.

What is claimed is:

1. An RF pulse generator comprising:

first and second lasers respectively generating first and second RF optical tones at first and second frequencies that are offset from one another by a set difference;

an optical combiner in optical communication with the first and second lasers to receive and combine the first and second optical tones to provide an optical signal comprising the combination of the first and second optical tones;

an optical switch in optical communication with the optical combiner configured to pass the optical signal when in an on state and to block the optical signal when in an off state;

an electrical signal generator configured to provide a periodic electrical signal to the optical switch to regularly switch the optical switch between the on state and the off state, wherein the optical switch passes the optical signal in the on state and blocks the optical signal in the off state to output a pulsed optical signal comprising a periodic sequence of optical pulses; and a photodetector in optical communication with the optical switch to receive the pulsed optical signal to generate a pulsed RF electrical signal comprising a periodic sequence of RF pulses, each RF pulse being generated by a corresponding optical pulse and having an RF frequency equal to the set difference.

2. The RF pulse generator of claim 1, wherein the optical switch is a Mach-Zehnder Modulator (MZM) configured to alternate between the on state that passes the optical signal and the off state that blocks the optical signal.

3. The RF pulse generator of claim 1, further comprising an erbium-doped fiber amplifier (EDFA) positioned following the optical switch, and the erbium-doped fiber amplifier is configured to amplify the first and second optical tones.

4. The RF pulse generator of claim 1, wherein the pulsed RF electrical signal has an RF frequency in the W-band between 75 GHz to 110 GHz.

5. The RF pulse generator of claim 1, wherein the set difference is at least 75 GHz and the pulsed RF electrical signal has a peak power of at least 20 dBm.

6. The RF pulse generator of claim 1, further comprising a local oscillator LO and an electro-optic phase modulator, wherein the first and second lasers are phase locked to a selected harmonic of a frequency comb generated by the local oscillator LO.

7. The RF pulse generator of claim 1, wherein the peak power $P_{pk}$ of the pulsed RF electrical signal is configured to increase relative to a maximum continuous-wave output power $P_{cw}$ proportional to $1/\sqrt{\delta}$, in which $\delta$ is a duty cycle of the periodic electrical signal.

8. The RF pulse generator of claim 1, further comprising an antenna coupled to the photodetector, wherein a conductor connecting the photodetector to the antenna has a length that is less than one half of a wavelength of the RF frequency.

9. The RF pulse generator of claim 8, wherein the periodic electrical signal provided to the optical switch has a non-rectangular waveform.

10. The RF pulse generator of claim 1, further comprising an antenna, wherein the pulsed RF electrical signal from the photodetector is applied directly to the antenna without an RF transmission line and without an RF amplifier.

11. The RF pulse generator of claim 10, wherein the photodetector and the antenna are integrally formed on the same substrate.

12. The RF pulse generator of claim 1, wherein the optical switch and the optical combiner are integrated on a common substrate.

13. The RF pulse generator of claim 1, wherein the first and second lasers are phase locked to each other.

14. An RF pulse generator comprising:

first and second lasers respectively generating first and second RF optical tones that are phase locked and frequency-offset by a difference corresponding to an RF carrier frequency;

an optical combiner in optical communication with the first and second lasers to receive and combine the first and second optical tones into a heterodyned optical signal having a beat frequency equal to the RF carrier frequency;

an optical modulator configured to receive a periodic electrical gating signal and to modulate the heterodyned optical signal to produce a pulsed optical signal having a duty cycle less than 10%; and a photodetector configured to receive the pulsed optical signal to generate a pulsed RF electrical signal having pulses at the RF carrier frequency, wherein the duty cycle is configured such that the photodetector produces a peak RF output power during each pulse that is at least double a maximum continuous-wave output power of the photodetector.

15. The RF pulse generator of claim 14, wherein the photodetector is a uni-traveling-carrier photodiode (UTC PD), and wherein the peak RF output power is at least 20 dBm at an RF frequency of 75 GHz.

16. The RF pulse generator of claim 14, wherein the first and second lasers are phase locked to a harmonic of a frequency comb generated by a local oscillator LO to set the RF carrier frequency.

17. The RF pulse generator of claim 14, further comprising an optical amplifier positioned between the optical switch and the photodetector and configured to amplify the optical pulses.

18. A method for generating a pulsed radio frequency (RF) signal, the method comprising:

generating a first optical tone at a first frequency with a first laser and a second optical tone at a second frequency with a second laser, wherein the first and second frequencies are offset from one another by a set difference;

combining the first and second optical tones to provide an optical signal comprising a combination of the first and second optical tones;

providing a periodic electrical signal to an optical switch to regularly switch the optical switch between an on state and an off state, wherein in the on state, the optical switch passes the optical signal, and, in the off state, the optical switch blocks the optical signal, such that the optical switch outputs a pulsed optical signal comprising a periodic sequence of optical pulses; and irradiating a photodetector with the pulsed optical signal to generate a pulsed RF electrical signal comprising a periodic sequence of RF pulses, each RF pulse having an RF frequency equal to the set difference.

19. The method of claim 18, wherein irradiating the photodetector comprises focusing the pulsed optical signal through a lens under defocused optical coupling conditions to increase the power handling of the photodetector.

20. The method of claim 18, further comprising:

generating a frequency comb from a local oscillator LO signal;

upconverting the frequency comb as sidebands of a reference laser; and selecting a specific harmonic of the frequency comb to define the set difference.

* * * * *